United States Patent
Titterington et al.

(10) Patent No.: US 7,753,510 B2
(45) Date of Patent: Jul. 13, 2010

(54) SOLID INK COMPOSITION WITH POST-MELT MIXING

(75) Inventors: Donald R. Titterington, Newberg, OR (US); Brent Rodney Jones, Sherwood, OR (US); David L. Knierim, Wilsonville, OR (US); Barry D. Reeves, Lake Oswego, OR (US); Edward F. Burress, West Linn, OR (US); Ernest Isreal Esplin, Sheridan, OR (US); Richard Guy Chambers, Portland, OR (US); Jasper Kent Wong, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 934 days.

(21) Appl. No.: 11/545,879

(22) Filed: Oct. 11, 2006

(65) Prior Publication Data

US 2008/0088684 A1 Apr. 17, 2008

(51) Int. Cl.
*B41J 2/175* (2006.01)
*B41J 2/15* (2006.01)
*G01D 11/00* (2006.01)

(52) U.S. Cl. ............................. 347/88; 347/21; 347/99

(58) Field of Classification Search .................. 347/88, 347/99, 84, 85, 95, 21
See application file for complete search history.

(56) References Cited

U.S. PATENT DOCUMENTS

| | | | | |
|---|---|---|---|---|
| 4,723,135 A | * | 2/1988 | Yano et al. | ..................... 347/20 |
| 5,023,388 A | * | 6/1991 | Luker | ............................. 585/9 |
| 5,223,860 A | | 6/1993 | Loofbourow et al. | |
| 5,442,387 A | | 8/1995 | Loofbourow et al. | |
| 5,734,402 A | * | 3/1998 | Rousseau et al. | ............... 347/88 |
| 5,777,636 A | * | 7/1998 | Naganuma et al. | ............ 347/10 |
| 5,908,950 A | * | 6/1999 | Cooke et al. | ................. 556/448 |
| 5,962,582 A | * | 10/1999 | Lange | ......................... 524/592 |
| 6,059,404 A | * | 5/2000 | Jaeger et al. | ................... 347/88 |
| 6,353,479 B1 | * | 3/2002 | Lubawy et al. | ............. 358/1.13 |
| 6,481,840 B1 | * | 11/2002 | Mueller et al. | ................. 347/88 |
| 6,761,443 B2 | | 7/2004 | Jones | |
| 6,840,613 B2 | | 1/2005 | Jones | |
| 6,877,850 B2 | * | 4/2005 | Ishimoto et al. | ............. 347/100 |
| 7,175,268 B2 | * | 2/2007 | Taguchi | ...................... 347/100 |
| 7,578,587 B2 | * | 8/2009 | Belelie et al. | ............... 347/105 |
| 2005/0151814 A1 | * | 7/2005 | Wong et al. | .................... 347/88 |
| 2005/0231584 A1 | * | 10/2005 | Rajaiah et al. | ............... 347/232 |
| 2006/0252088 A1 | * | 11/2006 | Dejneka et al. | ................. 435/6 |
| 2006/0268086 A1 | * | 11/2006 | Kawakami et al. | ........... 347/100 |
| 2007/0156628 A1 | * | 7/2007 | Rodriguez et al. | ............. 707/1 |
| 2007/0296783 A1 | * | 12/2007 | Jones | ........................... 347/88 |

* cited by examiner

*Primary Examiner*—Stephen D Meier
*Assistant Examiner*—Leonard S Liang
(74) *Attorney, Agent, or Firm*—Maginot, Moore & Beck LLP

(57) ABSTRACT

An ink stick for use in a phase change ink printer includes a first portion of a solid ink stick body, the first portion being formed of a first material of a phase change ink composition. The ink stick also includes a second portion of the solid ink stick body, the second portion being formed of a second material. The first material and the second material combine when the ink stick body is melted.

19 Claims, 10 Drawing Sheets

FIG. 4
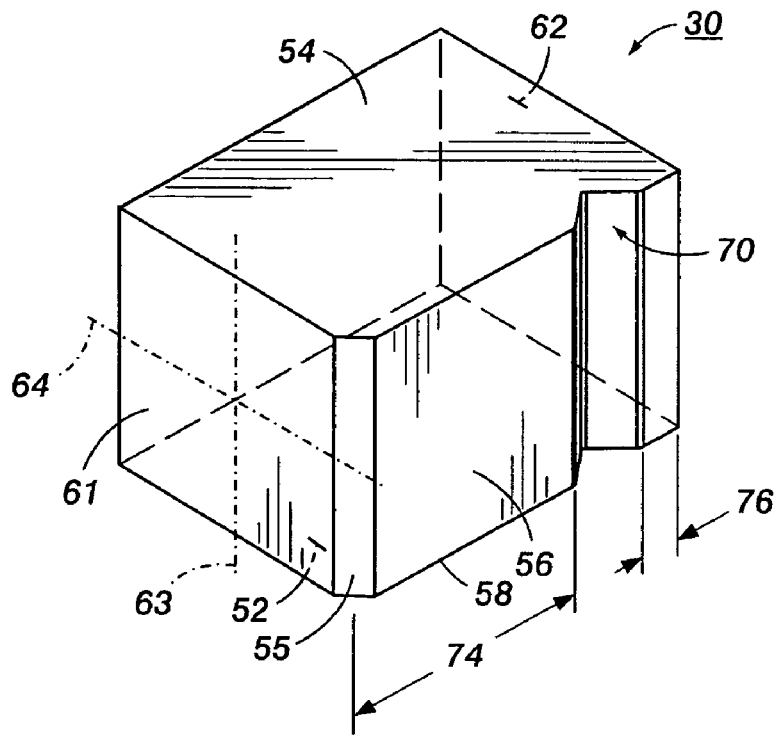
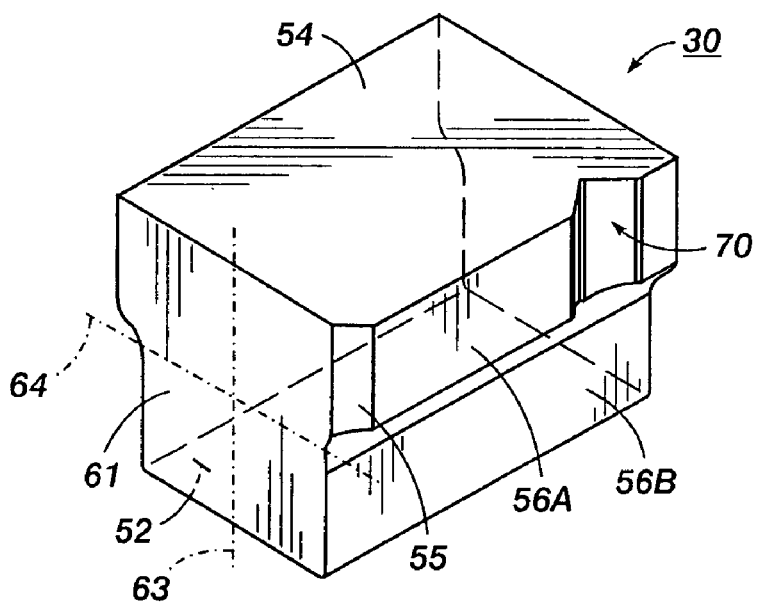
FIG. 5

FIG. 8
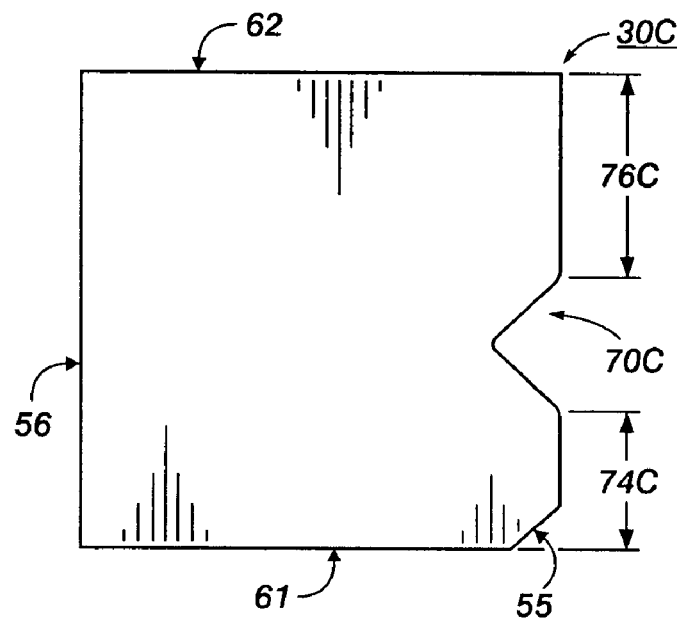
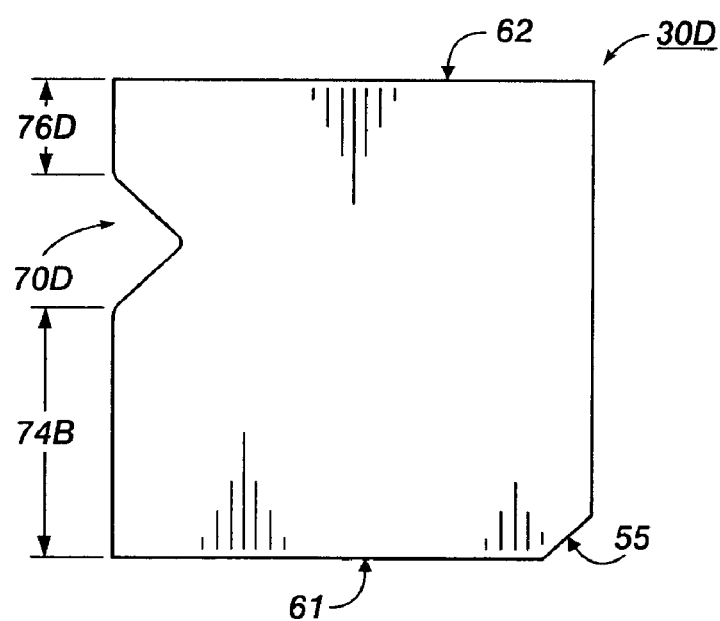
FIG. 9

SOLID INK COMPOSITION WITH POST-MELT MIXING

CROSS-REFERENCE TO RELATED APPLICATIONS

Reference is made to commonly-assigned copending U.S. patent application Ser. No. 11/546,064, entitled "Solid Ink Stick with Coating" by Lucas et al. being filed concurrently herewith, the disclosure of which is incorporated herein.

TECHNICAL FIELD

This disclosure relates generally to phase change ink jet printers, the solid ink sticks used in such ink jet printers, and the methods used to fabricate such an ink stick.

BACKGROUND

Solid ink or phase change ink printers conventionally receive ink in a solid form, either as pellets or as ink sticks. The solid ink pellets or ink sticks are placed in a feed chute and a feed mechanism delivers the solid ink to a heater assembly. Solid ink sticks are either gravity fed or urged by a spring through the feed chute toward a heater plate in the heater assembly. The heater plate melts the solid ink impinging on the plate into a liquid that is delivered to a print head for jetting onto a recording medium or intermediate transfer surface.

Phase change inks for color printing typically comprise a phase change ink carrier composition which is combined with a phase change ink compatible colorant. A color printer typically uses four colors of ink (yellow, cyan, magenta, and black). These colored inks can be formed by using a single dye or a mixture of dyes. For example, magenta can be obtained by using a mixture of Solvent Red Dyes or a composite black can be obtained by mixing several dyes. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

Ink sticks of each color are delivered through corresponding feed channels to a melt plate. The key plate has keyed openings to aid the printer user in ensuring that only ink sticks of the proper formulation and color are inserted into each feed channel. Each keyed opening of the key plate has a unique shape. The ink sticks of the color for that feed channel have a shape corresponding to the shape of the keyed opening. The keyed openings and corresponding ink stick shapes exclude from each ink feed channel ink, sticks of all colors except the ink sticks of the proper color for that feed channel. Unique keying shapes for other factors are also being employed to exclude unintended sticks from being incorrectly inserted, including formulation and market or geographic pricing differences.

Ink sticks currently in use are typically manufactured with a formed tub and flow fill process. In this method, the component dyes and carrier composition are first compounded and then heated to a liquid state and poured into a tub having an interior shape corresponding to the desired finished ink stick shape. The result is an ink stick that, at room temperature, is typically a solid or semi-solid having a wax-like consistency. Colorant added to the ink composition can be a dye or pigment or combination, for simplification the term dye will be used.

The tub may also be formed with indentations and protrusions for forming keying and coding features in the ink sticks, if desired. These key elements are protuberances or indentations that are located in different positions on an ink stick. In some cases, the key elements are placed on different sides of ink sticks of different colors that are included in an ink stick set. This enables for detection and identification of the different ink sticks, particularly during loading, as noted above. For instance, corresponding keys on the perimeters of the openings through which the ink sticks are inserted into their appropriate feed channel exclude ink sticks of the set, particularly those of different colors, which do not have the appropriate perimeter key element.

Even with keying features, however, the incorrect identification and loading of ink sticks into the appropriate feed channel can be problematic. For instance, incorrect loading of the ink sticks generally occurs in one of two ways, either by loading the incorrect color and shaped ink stick in the incorrect key plate or by inserting the correctly colored ink stick incorrectly in the correct receptacle. One reason for this is that ink sticks may be so saturated with color dye that it may be difficult for a printer user to tell by color alone which color is which. Cyan, magenta, and black ink sticks in particular can be difficult to distinguish visually based on color or other appearance.

Moreover, if an ink stick is inadvertently inserted through the wrong opening in a key plate or if the correct ink stick is incorrectly oriented during insertion, the ink stick can be damaged and small pieces or particles of ink can be broken off the main ink stick body. Thus, while the keying features of an ink stick may work to prevent the wrong color ink stick from being inserted into a feed channel, the soft exterior surface of an ink stick may be damaged making the entire ink stick unusable as a result.

An ink stick is typically pushed or slid along the feed channel by the feed mechanism until it reaches the melt plate. An ink stick's waxy exterior surface generates friction as the ink stick is pushed along a feed channel. This friction may cause stick-slip movement of the ink stick and the ink stick may get skewed and hang up or catch within the feed channel. The friction encountered by an ink stick increases in proportion to the number of ink sticks that are in the feed channel and is significantly affected by the elevated environmental temperatures within the printing device.

Some provisions have been made to prevent the solid masses of shaped ink from sticking to surfaces of the feed chutes so that an unrestricted feed of ink sticks proceeds down the channel to the heater plate for melting. For instance, the feed channel and/or the ink stick may include cooperating alignment and orientation features that facilitate alignment of ink sticks in the feed channel so the possibility of jamming due to skewing of the ink stick is reduced. The areas on a typical ink stick for keying and guiding elements, however, are typically small. Simply increasing the size of a stick to accommodate additional features may not be beneficial because the lateral dimensions of the ink stick must not exceed constraining dimensions of the ink loader or printer.

SUMMARY

An ink stick for use in a phase change ink printer comprises a first portion of a solid ink stick body, the first portion being formed of a first material of a phase change ink composition. The ink stick also comprises a second portion of the solid ink stick body, the second portion being formed of a second material. The first material and the second material combine when the ink stick body is melted. One of the material portions may not be required of the ink stick composition provided it is present in a minute volume that does not alter imaging performance. Such material may provide a benefit to other concerns such as handling robustness, feed friction, aesthetics, sensing and so forth. One of the portions may comprise a small area or volume of the ink stick or may be any greater amount.

In another aspect, a method for a feed system of a phase change ink imaging device comprises inserting an ink stick into an ink loader of a phase change ink imaging device. The ink stick comprises a solid ink stick body having a first portion formed of a first material of a phase change ink composition, and a second portion formed of a second material. The ink stick is then melted in the ink loader. The first and second components of the melted ink stick are then combined to form a full phase change ink composition or may retain properties of the primary composition that is substantially unchanged by the combination.

In yet another aspect, a method of manufacturing an ink stick for use in a phase change ink imaging device comprises selecting a first component of a phase change ink composition to use to form a first portion of a solid ink stick body. A second component of the phase change ink composition is selected to form a second portion of the solid ink stick body. The solid ink body is then formed having a first portion formed of the first component and a second portion formed of the second component.

BRIEF DESCRIPTION OF THE DRAWINGS

FIG. 4 is a perspective view of one embodiment of a solid ink stick.

FIG. 5 is a perspective view of another embodiment of a solid ink stick.

FIG. 8 is a top elevational view of another solid ink stick.

FIG. 9 is a top elevational view of another solid ink stick.

DETAILED DESCRIPTION OF THE PREFERRED EMBODIMENT

Figure 1:
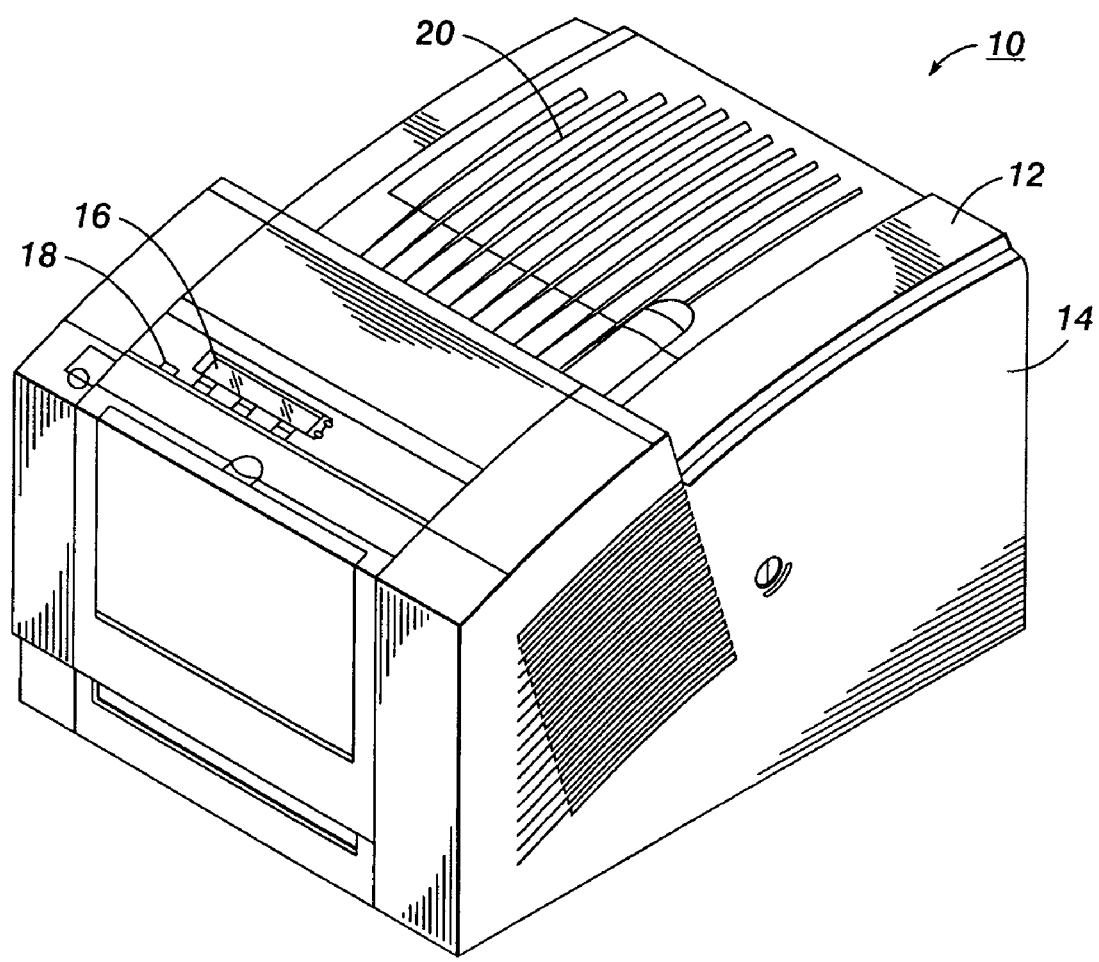
FIG. 1 is a perspective view of a phase change printer with the printer top cover closed.

For a general understanding of the present embodiments, reference is made to the drawings. In the drawings, like reference numerals have been used throughout to designate like elements.

Figure 2:
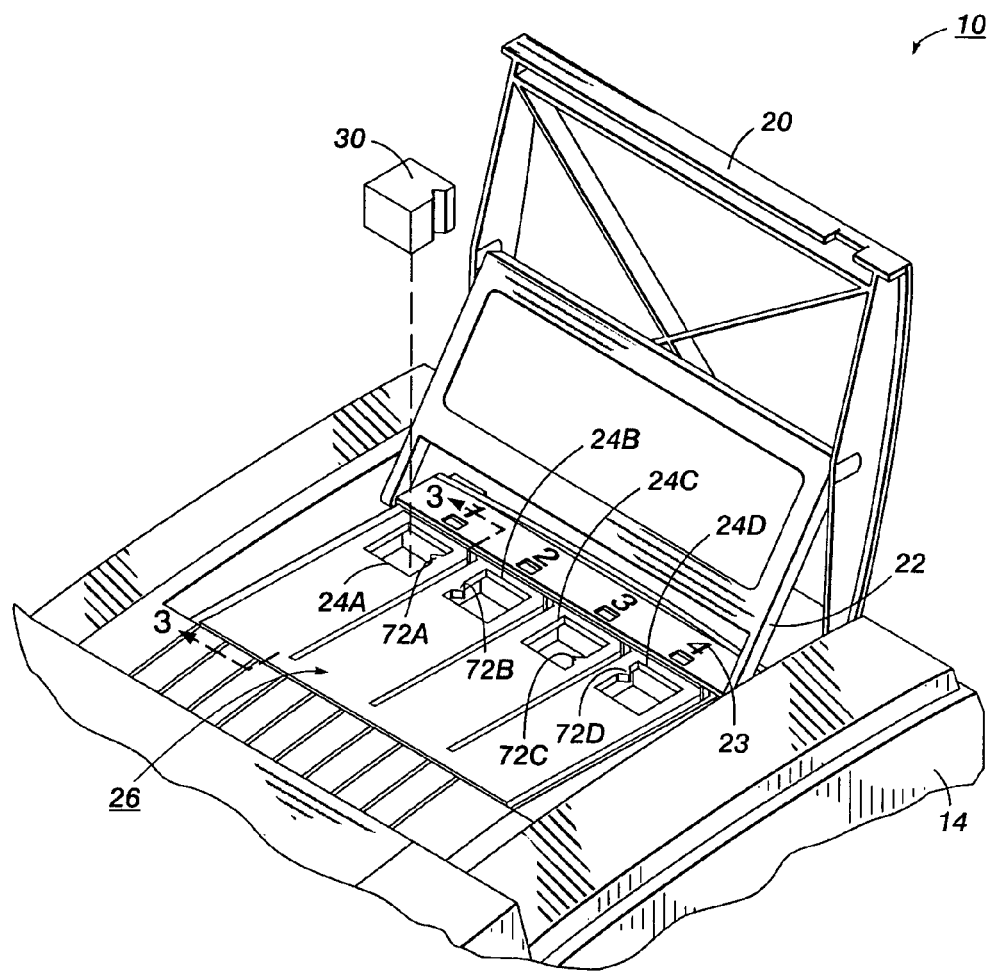
FIG. 2 is an enlarged partial top perspective view of the phase change printer with the ink access cover open, showing a solid ink stick in position to be loaded into a feed channel.

FIG. 1 shows a solid ink, or phase change, ink printer 10 that includes an outer housing having a top surface 12 and side surfaces 14. A user interface display, such as a front panel display screen 16, displays information concerning the status of the printer, and user instructions. Buttons 18 or other control elements for controlling operation of the printer are adjacent the user interface window, or may be at other locations on the printer. An ink jet printing mechanism (not shown) is contained inside the housing. An ink feed system delivers ink to the printing mechanism. The ink feed system is contained under the top surface of the printer housing. The top surface of the housing includes a hinged ink access cover 20 that opens as shown in FIG. 2, to provide the user access to the ink feed system.

Figure 3:
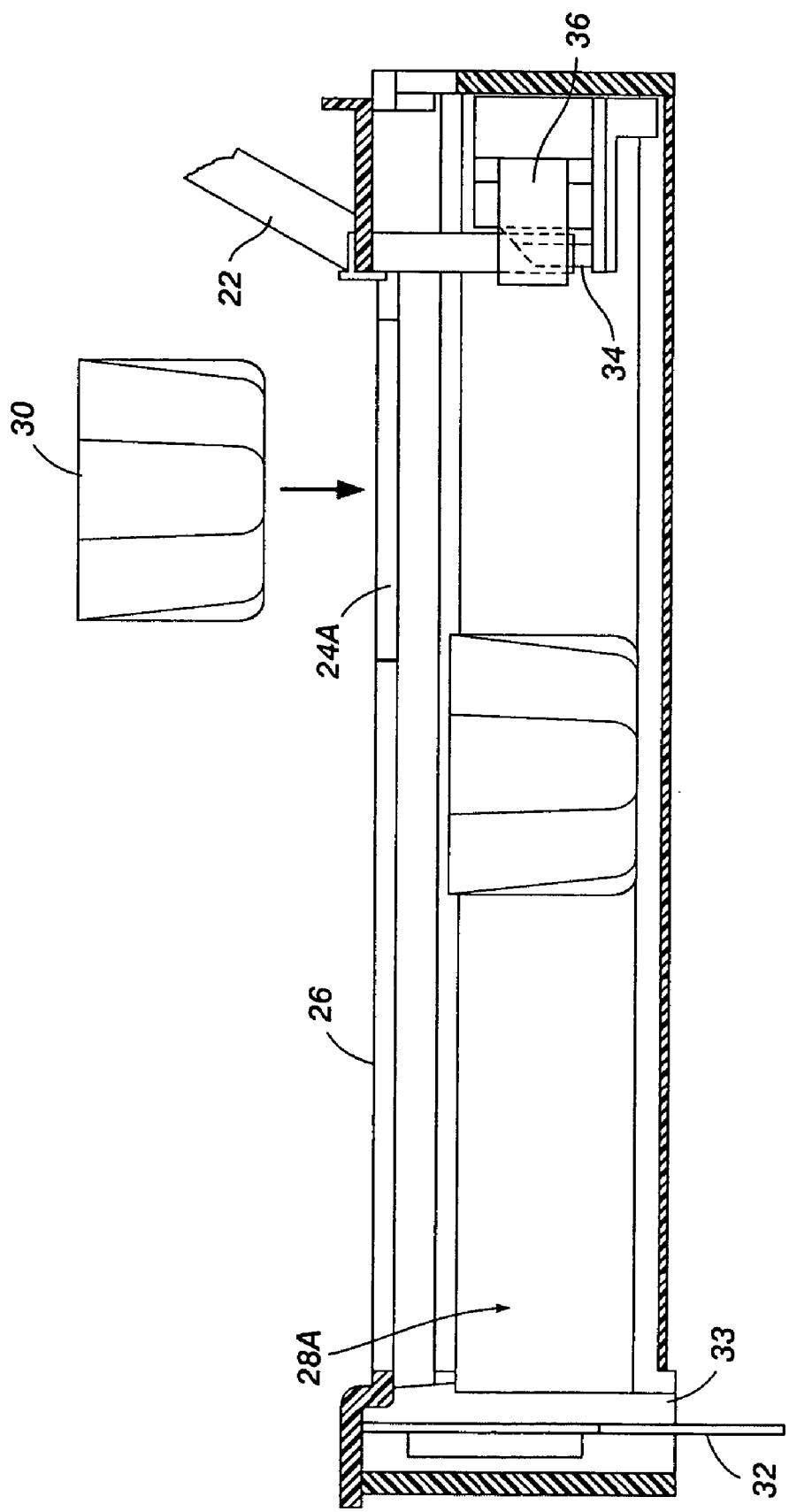
FIG. 3 is a side sectional view of a feed channel of a solid ink feed system taken along line 3-3 of FIG. 2.

In the particular printer shown, the ink access cover 20 is attached to an ink load linkage element 22 so that when the printer ink access cover 20 is raised, the ink load linkage 22 slides and pivots to an ink load position. As seen in FIG. 2, opening the ink access cover reveals a key plate 26 having keyed openings 24A-D. Each keyed opening 24A, 24B, 240, 24D provides access to an insertion end of one of several individual feed channels 28A, 28B, 28C, 28D of the solid ink feed system (see FIGS. 2 and 3).

Each longitudinal feed channel 28A-D delivers ink sticks 30 of one particular color to a corresponding melt plate 32. Each feed channel has a longitudinal feed direction from the insertion end of the feed channel to the melt end of the feed channel. The melt end of the feed channel is adjacent the melt plate. The melt plate melts the solid ink stick into a liquid form. The melted ink drips through a gap 33 between the melt end of the feed channel and the melt plate, and into a liquid ink reservoir (not shown). The feed channels 28A-D have a longitudinal dimension from the insertion end to the melt end, and a lateral dimension, substantially perpendicular to the longitudinal dimension. Each feed channel in the particular embodiment illustrated includes a push block 34 driven by a driving force or element, such as a constant force spring 36, to push the individual ink sticks along the length of the longitudinal feed channel toward the melt plates 32 that are at the melt end of each feed channel. The tension of the constant force spring 36 drives the push block toward the melt end of the feed channel. The ink load linkage 22 is coupled to a yoke 38, which is attached to the constant force spring 36 mounted in the push block 34. The attachment to the ink load linkage 22 pulls the push block 34 toward the insertion end of the feed channel when the ink access cover is raised to reveal the key plate 26.

A color printer typically uses four colors of ink (yellow, cyan, magenta, and black). Ink sticks 30 of each color are delivered through a corresponding individual one of the feed channels 28A-D. The operator of the printer exercises care to avoid inserting ink sticks of one color into a feed channel for a different color. The key plate 26 has keyed openings 24A, 24B, 240, 24D to aid the printer user in ensuring that only ink sticks of the proper color are inserted into each feed channel. Each keyed opening 24A, 24B, 240, 24D of the key plate has a unique shape. The ink sticks 30 of the color for that feed channel have a shape corresponding to the shape of the keyed opening. The keyed openings and corresponding ink stick shapes exclude from each ink feed channel ink sticks of all colors except the ink sticks of the proper color for that feed channel.

An exemplary solid ink stick 30 for use in the feed system is illustrated in FIG. 4. The ink stick is formed of a three dimensional ink stick body. A substantially cubic ink stick body is illustrated in FIG. 4. The ink stick body illustrated has a bottom, represented by a general bottom surface 52, and a top, represented by a general top surface 54. The top and bottom surfaces are shown substantially parallel one another. However, the surfaces of the ink stick body need not be flat, nor need they be parallel or perpendicular one another. Nevertheless, these descriptions will aid the reader in visualizing, even though the surfaces may have three dimensional topography, or be angled with respect to one another. The ink stick body also has a plurality of side extremities, such as side surfaces 56, 61, 62. The illustrated embodiment includes four side surfaces, including two end surfaces 61, 62 and two lateral side surfaces 56. The lateral side surfaces 56 are substantially parallel one another, and are substantially perpendicular to the top and bottom surfaces 52, 54. The end surfaces 61, 62 are also substantially parallel one another, and substantially perpendicular to the top and bottom surfaces, and to the lateral side surfaces. The ink stick is configured to fit into the feed channel of the feed channel with the two lateral side surfaces 56 of the ink stick body oriented along the longitudinal feed direction of the feed channel. With the substantially cubic ink stick shape illustrated, the end surfaces are thus oriented along the transverse or lateral dimension of the feed channel. One of the end surfaces 61 is a front or leading end surface, and the other end surface 62 is a rear or trailing end surface. The bottom surface has lateral edges 58 at which the bottom surface 52 intersects the lateral side surfaces 56.

The outermost lateral dimension of the ink stick body is only fractionally smaller than the lateral dimension of the ink stick feed channel 28A. For example, the ink stick body has a longitudinal dimension between the end surfaces, including keying features, of between approximately 0.8 and 2.0 inches (20-51 mm), such as 1.2 inch (30 mm). The ink stick body has a lateral dimension between the lateral extremities of between approximately 1.0 and 2.0 inches (25-51 mm), such as 1.5 inch (38 mm). The ink stick body has a vertical dimension between the top and bottom surfaces of between approximately 0.8 and 1.6 inches (20-41 mm), such as 1.3 inches (34 mm). The lateral dimension of the ink stick feed channel is approximately 0.004 to 0.2 inches (0.1-5.0 mm) wider than the lateral dimension of the ink stick body. Thus, the ink stick body remains substantially upright in the feed channel.

The ink stick body has an outer perimeter that is substantially horizontal around the largest horizontal cross section of the ink stick body. In the ink stick embodiment illustrated in FIG. 4 in which the side surfaces are substantially vertical, the outer perimeter is substantially uniform from the bottom surface to the top surface of the ink stick body. In the ink stick embodiment illustrated in FIG. 5, the horizontal outer perimeter substantially corresponds with the top surface 54 of the ink stick body. The outermost lateral side portions 56A of the ink stick body form longitudinal ink stick body perimeter segments that extend substantially parallel with the longitudinal feed direction of the feed channel when the ink stick is inserted into the feed channel. After considering the present disclosure, those skilled in the art will recognize that the outermost longitudinal segments of the perimeter can be in different positions along the height of the ink stick body. The perimeter longitudinal segment on one of the lateral side surfaces can even be at a different height than the perimeter longitudinal segment on the other lateral side surface.

The ink sticks shown in FIGS. 4 and 5 have a substantially horizontal cross-sectional shape, formed of the perimeter of the ink stick body as when the ink stick is viewed from above the top surface, corresponding to the shape of a respective keyed opening 24 of the corresponding feed channel for that particular color. The ink stick body includes a key element 70 of a particular predetermined size, shape, and location on the outer perimeter of the ink stick body. In the particular examples illustrated, the ink stick key element 70 is formed in the longitudinal perimeter segment formed by the outermost portion of the lateral side surface. For an ink stick of a particular color, the ink stick key element 70 matches a complementary key 72 formed in the perimeter of the keyed opening 24 in the key plate. Each color for a printer has a unique arrangement of one or more key elements in the outer perimeter of the ink stick to form a unique cross-sectional shape for that particular color ink stick. The combination of the keyed openings 24A, 24B, 24C and 24D in the key plate 26 and the keyed shapes of the ink sticks 30 (formed by the key elements 70) insure that only ink sticks of the proper color are inserted into each feed channel. A set of ink sticks is formed of an ink stick of each color, with a unique key arrangement for ink sticks of each color.

In the ink stick embodiments shown in FIGS. 4 and 5, the key element 70 is a vertical recess or notch formed in one of the lateral side surfaces 56 of the ink stick body. The corresponding complementary key 72 on the perimeter of the keyed opening 24 is a complementary protrusion into the opening. An inwardly directed key element, such as a notch, in the ink stick body provides improved ability to exclude incorrect ink sticks. Only an ink stick with a recess of that particular shape, location, and size (or larger) will fit through the keyed opening in the key plate having a key consisting of a corresponding protrusion from the edge of the keyed opening. In addition, a recessed key element on the ink stick body allows much of the lateral side surfaces 56 of the ink stick body to be substantially flat. In particular, the sections of the lateral side surfaces 56 adjacent the corners with the end surfaces 61, 62 of the ink stick body can be flush with one another, and be the outermost lateral portions of the lateral side surface. The outermost lateral portions of the lateral side surfaces are the portions that tend to interact with the side walls of the feed channel that form the feed channel. Having the end sections of the lateral side surfaces as the outermost portions of the ink stick provides balanced sections that help the ink stick retain its proper orientation as the ink stick moves through the feed channel. The key element extends at least approximately 0.16 inch (4 mm) into the ink stick body.

In the embodiment illustrated in FIG. 4, with a substantially flat lateral side surface extending from the bottom surface to the top surface, the key element 70 extends along the entire height of the lateral surface. The ink stick can pass through the keyed opening having a protrusion at a corresponding position of the keyed opening. The embodiment of FIG. 5 has the key element extend only along the portion of the lateral side surface 56A of the wider portion of the ink stick. In this embodiment, the corresponding key 72 on the keyed opening 24 of the key plate 26 does not extend far enough into the opening to require that the key element 70 be included in the narrower portion of the ink stick body.

The key element 70 on the ink stick body has a particular position with respect to the other perimeter segment of the ink stick body. For example, the key element has a particular spatial relationship with respect to the edges at which the perimeter segment containing the key element intersects other perimeter segments of the ink stick body. In further particularity, the key element 70 on the side surface 56 has a particular position with other surfaces of the ink stick body, such as the end surfaces 61, 62. The ink stick key element is located a leading distance 74 from the leading end surface 61 of the ink stick body, and a trailing distance 76 from the trailing end surface 62 of the ink stick body. In the embodiments illustrated in FIGS. 4 and 5, the leading distance 74 is substantially greater than the trailing distance 76. For example, the leading distance may be three times the trailing distance.

Figure 6:
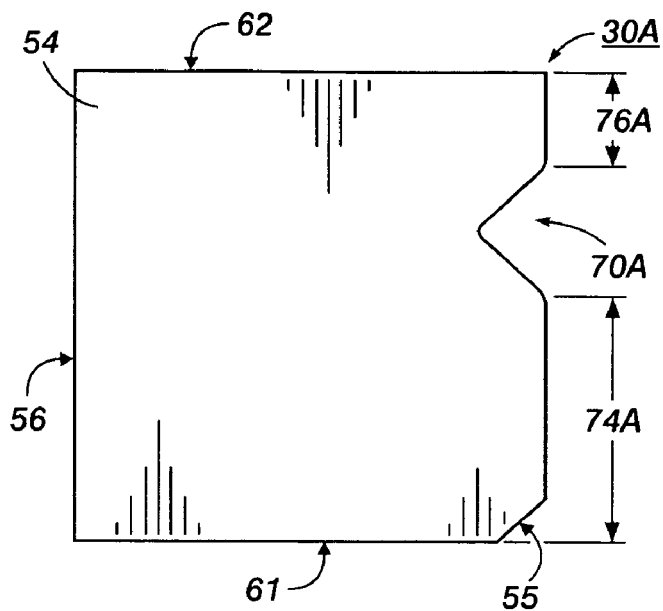
FIG. 6 is a top elevational view of the solid ink stick of FIG. 4.
Figure 7:
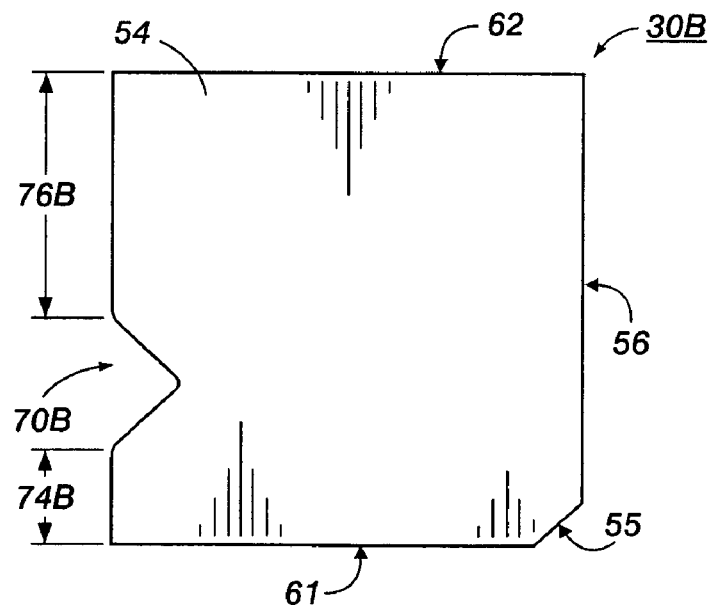
FIG. 7 is a top elevational view of another solid ink stick.

FIG. 6 is a top view of the ink stick of FIG. 4. A top view of the ink stick of FIG. 5 is identical. FIGS. 7, 8, and 9 are top views of ink sticks that may be included in a multi-color set of ink sticks for use in the printer shown in FIGS. 1-3. As can be seen by comparing ink stick shapes of FIGS. 6, 7, 8, and 9 with the keyed openings 24 of the key plate visible in FIG. 2, a set of ink sticks provides a unique one-to-one match between a particular color ink stick and the keyed openings providing access to the four ink stick feed channels. Such one-to-one match is provided by including a key element 70 of a single predetermined size and shape at different locations around the outer perimeter of the ink stick body. For example, an ink stick with the key element 70A positioned as shown in FIG. 6 can be inserted into the first keyed opening 24A in the key plate shown in FIG. 2, but cannot be inserted into any of the other keyed openings 24B, 24C, 24D. The keys 72B, 72C, 72D in the keyed openings 24B, 24C, 24D of the key plate and corresponding to the key element positions shown in the ink sticks 30B, 30C, 30D of FIGS. 7, 8, and 9 will block the ink stick 30A of FIG. 6. The ink stick 30B having the key element 70B positioned as shown in FIG. 7 can be inserted into the second keyed opening 24B of the key plate shown in FIG. 2, but not into the other keyed openings 24A, 24C, 24D. The ink sticks having the key elements 70C, 70D positioned as shown in FIGS. 8 and 9 (respectively) can be inserted into and only into the third and fourth key openings 24C, 24D, which correspond to the third and fourth ink stick feed channels. Thus, the key elements 70A, 70B, 70C, 70D provide discrimination among the different feed channels to stop the user from inserting an ink stick into the incorrect ink stick feed channel.

An orientation feature 55 in each ink stick is useful to prevent erroneous ink insertion when the key element patterns (size and position) are symmetrical. The orientation feature illustrated is a corner notch in each ink stick. Referring to FIGS. 6 and 7, the orientation feature prohibits incorrect insertion of the first ink stick 30A into the second keyed opening 24B if the leading distance 74A and trailing distance 76A of the first ink stick are the same as the trailing distance 76B and leading distance 74B of the second ink stick. Those skilled in the art will identify numerous other types and configurations of features to ensure that ink sticks are inserted into the key opening with the correct orientation. For example, the orientation feature can be provided by positioning the key elements 70 so that the leading and trailing distances on different ones of the ink sticks are not symmetrical. Referring to the ink sticks shown in FIGS. 6 and 7, the orientation feature can be provided by having the leading distance 74A of the first ink stick 30A a different length than the trailing distance 76B of the second ink stick 30B and the trailing distance 76A of the first ink stick 30A a different length than the leading distance 74B of the second ink stick 30B.

In addition to features that are formed in the solid ink stick that aid, for example, in keying and orientation, the solid ink stick may further include an overcoat or layer applied to at least a portion of the exterior surface of the ink stick to impart desired characteristics to the surface of the ink stick. The coating composition may be any composition suitable for treating the surface of an ink stick and capable of remaining on the surface for more than a transitory period. The overcoat should also be non-reactive with the underlying phase change ink material and should not be incompatible with the phase change ink printers in which they are used. Suitable methods for the application of the overcoat include dipping, painting, rolling, spraying, stamping, over molding or co-extrusion (explained in more detail below).

In one embodiment, the overcoat is a protective coating for providing surface properties of durability and resistance to adhesion, water and humidity to the exterior surface of an ink stick. The protective coating may comprise one or more layers of wax. The wax may be selected from both natural and synthetic waxes. Typically, these waxes are solid at ambient temperature. The waxes are typically supplied either as neat solids or in aqueous emulsions or dispersions and may be oxidized high density polyethylene waxes such as polyolefin wax, ethylene acrylic acid wax; polyolefin glycol wax; stearate wax; amide wax; petrolatum wax such as paraffin wax and microcrystalline; silicone wax; mineral wax such as montan wax, polypropylene wax; carnauba wax; and fluorocarbon wax such as polytetrafluoro ethylene wax. The wax is advantageously applied in the molten state in order to facilitate uniformity of application and adhesion, but can alternatively be applied as a powder and pressed and optionally heated to melt the wax.

Typically, the wax may be present in the amount of about 3% to about 100% by weight, more typically in the amount of about 30% to about 70% by weight, based on the total weight of the overcoat layer. Optionally, this overcoat layer may contain acrylic and methacrylic polymers. Typically, the acrylic polymer is present in the amount of about 5 to about 97% by weight, more typically in the amount of about 30% to about 70% by weight, based on the total weight of the layer.

The coating may have any desired thickness as may be necessary to achieve the desired characteristic. The amount of coating applied may vary depending upon the degree of the desired hardness of a coating film, the desired viscosity of a coating material, the presence of other additives and the like. Additionally, a thicker and/or tougher coating may be applied to the surface areas of the solid ink stick which receive the greatest stress and wear such as the bottom surface and lateral sides of the ink stick that come into contact with the interior surfaces of the feed channel. As a further aid to protecting the ink stick after the stick has been inserted into a feed channel, the feed channel may be coated with compatible anti-friction or anti-wear compositions.

An advantage of using a protective wax overcoat on a solid ink stick is improved toughness or robustness of the exterior surface or specific features of the ink stick so that handling would be less likely to cause damage such as cracks or crumbling. Therefore, inadvertently loading or attempting to load an ink stick of one color into the feed channel or key plate of another color is less likely to damage the ink stick. Friction in the feed channel is reduced and, therefore, the ink stick has a reduced propensity to stick or jam after being inserted. Protrusions and indentations are less susceptible to breaking or cracking because the surface of the ink stick is more robust or harder. Moreover, a harder exterior surface of an ink stick may protect the ink stick from atypical environmental conditions once the product leaves the factory, such as unusually high humidity or temperatures.

Other additives may be present in the protective overcoat layer for improving other qualities of the exterior surface of the ink stick such as color quality or hue. For instance, in another embodiment, the overcoat may include additives such as dye highlighters for enhancing the vibrancy or hue of the exterior surface of the ink stick. As mentioned above, cyan, magenta, and black ink compositions may be difficult to visually distinguish in solid form. By enhancing the color vibrancy or hue of the exterior surface of the ink stick while in solid form, the ability of a printer user to identify colors of ink sticks is improved making incorrect loading of an ink stick less likely. Dye highlighters and color enhancing compositions are known in the art, and any suitable dye highlighter or color enhancing additive that is compatible with the phase change ink composition and phase change ink printers may be used. As mentioned above, the color enhancing additives may be included in the protective coating to provide a protective color enhancing coating. Alternatively, a color enhancing coating may be applied as a separate layer on top of or underneath the protective coating.

As an alternative to providing an overcoat layer comprised of components that are not included in the phase change ink composition, the overcoat layer may be comprised of materials taken from the phase change ink composition itself. In this embodiment, the ink stick is formed of an incomplete mixture of the materials of the phase change ink composition such that the final correct balance of components and mixing occurs while in the heated liquid state after being fed into the melt plate of the ink loader. The overcoat layer is composed of at least one material of the phase change ink composition that exhibits a desired characteristic. For instance, the overcoat layer may be composed of materials of the phase change ink composition that exhibit properties of hardness or low friction coefficients, such as wax. Additionally, any coloring agents used in the phase change ink composition may be incorporated into the overcoat layer so that hue or vibrancy of the color of the exterior surface is enhanced relative to the exterior surface of a fully mixed ink stick.

The selected materials are applied as an overcoat layer to an ink stick composed of the remaining ink stick composition materials. Thus, all the materials of the phase change ink composition are present in the ink stick. This type of ink stick may be fabricated using a co-extruding or co-molding process or other methods, including those listed previously. The final controlled mixing of the separated or partially mixed ink stick materials takes place after the ink stick has been fed to the melt plate of the printer and the exterior and interior components have melted. The melting process enables the subsequent mixing of the overcoat layer and the interior portion of the ink stick or other layered configurations such that an appropriate resulting phase change ink compound is formed prior to being jetted onto a printer drum or print substrate. An advantage of controlled mixing and separation of constituents may be increased adhesion of independent beads, or grains of ink that were compressed into a larger form or bigger pieces that bond, or join, together.

The exemplary coatings described above are beneficial in providing an ink stick with an exterior surface that has, for example, increased durability for handling, lower friction to facilitate movement in the feed channel, and/or enhanced vibrancy to aid in visual identification by a printer user. In another embodiment, the overcoat may be comprised of one or more dyes or pigments applied to a surface of the ink stick. The dye or pigment may be of any known type. In particular, the dye or pigment is adapted to be compatible with the phase change ink composition to which it is applied. Sensor or optical coatings may be highly localized or in the form of readable markings and may be substantially thicker than say, an over spray, to ensure visual recognition or discernment by sensors.

In one embodiment, the overcoat comprising the dye and/or pigment may be applied to the exterior surface of an ink stick in a coded pattern of lines, dots or symbols, such as a barcode. The coded pattern may be used to represent identification, authentication and/or control information to be associated with a particular ink stick. The coded pattern or barcode may be read by a suitable optical scanner which sweeps a beam of light across the coded pattern, reading the lines, dots and/or symbols and translating the pattern into the identification, authentication and/or control information or alternatively, by a stationary beam that the ink passes during loading or feed or by a combination of stationary and moving beams.

The coating may include a magnetic component, such as magnetic ink or pigment. The magnetic ink component of the coating may be comprised of any suitable magnetic ink material such as, for instance, magnetite or magnetic iron oxide. The magnetic ink may be used to encode the identification, authentication and/or control information to be associated with a particular ink stick. The coating comprising the magnetically encoded information is applied to the exterior surface of an ink stick and may be read and translated by a magnetic ink reader, such as are used to read the magnetic ink printing on checks.

In another embodiment, the overcoat comprises a light responsive coating capable of reflecting or emitting a machine detectable light signature. The light signature may be used in a number of ways by a suitably equipped phase change ink jet printer such as for identification and/or authentication of the ink stick, or to activate a particular function within a print engine. The light responsive coating may be provided in a coating composition comprised of a fluorescent or light absorbing dye and a solvent. As referred to herein the term "fluorescent dye" shall mean a dye which absorbs light at a first wavelength and emits light at second wavelength. A fluorescent dye comprises one or more chemical agents that may not be visible or easily seen by the unaided eye but they fluoresce when exposed to proper stimuli such as infrared light or ultraviolet light, depending on the particular chemical agents being used. Any suitable solvent may be used. The composition may further comprise additives, stabilizers, and other conventional ingredients of inks, toners and the like. In some embodiments, various varnishes or additives, such as polyvinyl alcohol, can be added to the light responsive coating composition to reduce absorption of the dye into the ink stick and ensure that the dye remains on the surface of the ink stick. The amount of fluorescent dye and solvent included in the light responsive coating should be sufficient to leave a fine residue of dye on the surface of the ink stick after the solvent has completely evaporated therefrom. The composition is initially applied as a thin film. Sufficient dye should be present on the surface so that the fluorescent response of the light responsive coating is readily seen when irradiated with the appropriate stimuli, such as infrared or ultraviolet light, yet does not interfere with color rendering in the visible spectrum.

The identification, authentication or control information comprised in the light altering/responsive coating is applied to the exterior surface of the ink stick using a suitable encryption scheme or code. The light responsive coating may be comprised of one or more fluorescent dyes that fluoresce at known wavelengths or light absorbing dies that absorb light at a wavelength or range of wavelengths and can include ink composition elements or other material to serve as a binder and/or dilutant. When the mark or marks fluoresce, reflect or absorb light at a known wavelength, the output light for each mark can be detected and the presence or absence of the mark can be determined by sensors that detect light of particular wavelengths. Such sensors for detecting wavelengths of light are well known.

Figure 10:
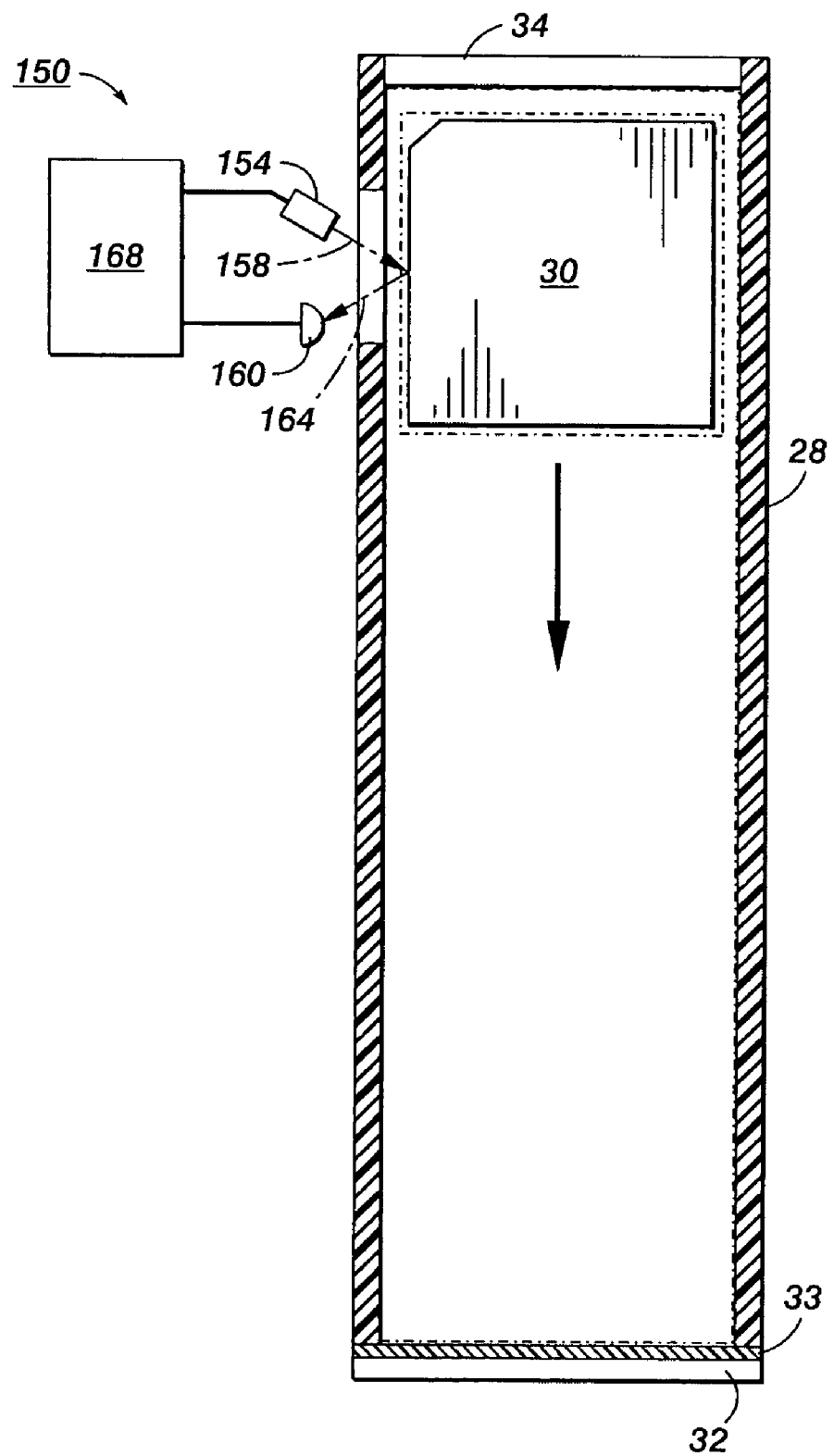
FIG. 10 is a schematic view of a fluorescent light detection apparatus for detecting fluorescent emissions of a light responsive coating.

Referring to FIG. 10, a fluorescent light detection or similar wavelength apparatus 150 may comprise one or more laser diodes or arrays 154 for emitting one or more stimulating rays, or laser beams 158, onto the light responsive coating (not shown), and one or more photodetectors or arrays 160 for sensing the fluorescent emission 164 released from the fluorescent dye in the light responsive coating upon being stimulated by a laser beam 158. A controller 168 controls laser diode output 154 and receives input comprising the wavelength of the fluorescent emissions sensed by the photodetector array 160. The laser diodes 154 and photodetectors 160 may be located anywhere along the feed path that an ink stick 30 follows once the stick is inserted into the printer. For instance, as shown in FIG. 10, the laser diode 154 and photodetector 160 may be located in a feed channel 28 of the printer in an area proximate the insertion end so as to be able to detect fluorescent emissions before the ink stick 30 reaches the melt plate 32 and gap 33. If necessary, the apparatus 150 may include optical filters to eliminate or minimize undesired radiation, and any pattern recognition circuitry appropriate to the particular code patterns recorded.

Referring again to FIG. 10, as an example of the operation of the fluorescent light detection apparatus, an ink stick 30 includes a light responsive coating (not shown) indicating that the ink stick 30 is a cyan colored ink stick. Once inserted into a feed channel 28, the controller fluorescent light detection apparatus 150 for that particular feed channel causes the laser diode array 154 to emit a stimulating ray 158 onto the light responsive coating causing the fluorescent dye or dyes in the mark to fluoresce. The photodetector array 160 senses the wavelength(s) of the fluorescent emission of the dyes. The controller 168 receives the wavelength information from the photodetector 160 and compares the wavelength information to the table of reference wavelengths to gather additional information about the ink stick 30. For instance, the information gathered may indicate the color of the ink stick, in this case cyan, or may indicate the model of printer for which the ink stick is intended. If the fluorescent light detection apparatus is located in the feed channel for black ink and determines from the emitted light that the current ink stick is a cyan ink stick, the controller 168 may then send to the printer controller (not shown) a signal indicating that print operations should be stopped or paused. In addition, a message may be displayed to a user on a user interface of the printer indicating that an incorrectly colored ink stick was inserted into the black ink feed channel. Moreover, if the fluorescent light detection apparatus 150 determines that the ink stick 30 was manufactured for a different model of printer, the controller 168, again, may send a signal indicating that print operations should be stopped or paused, and a message may be displayed to a user at a user interface of the printer indicating that an incorrect model of ink stick has been inserted into a feed channel.

Multiple wavelengths of light stimuli may be used, including multiple wavelengths of infrared, visible and ultraviolet light, or combinations of these. Single fluorescent dyes or combinations of dyes that absorb and emit different wavelengths may be used. In the case of two or more dyes, the different dyes may be applied in different locations on the ink stick. The differing wavelengths of dyes and locations of dyes may create a pattern of sensor output signals that enable additional information about the ink stick to be gathered. This information can then be processed further by the controller 168. For example, the controller may compare the fluorescent wavelengths detected by the photodetector 160 to data stored in a data structure, such as a table. The data stored in the data structure may correspond to a plurality of wavelengths with associated information. The "associated information" may include the ink stick identification and authentication information. Various types of instructional information for the printer may be included. These functions may be either enabled or controlled by the information made available.

Figure 11:
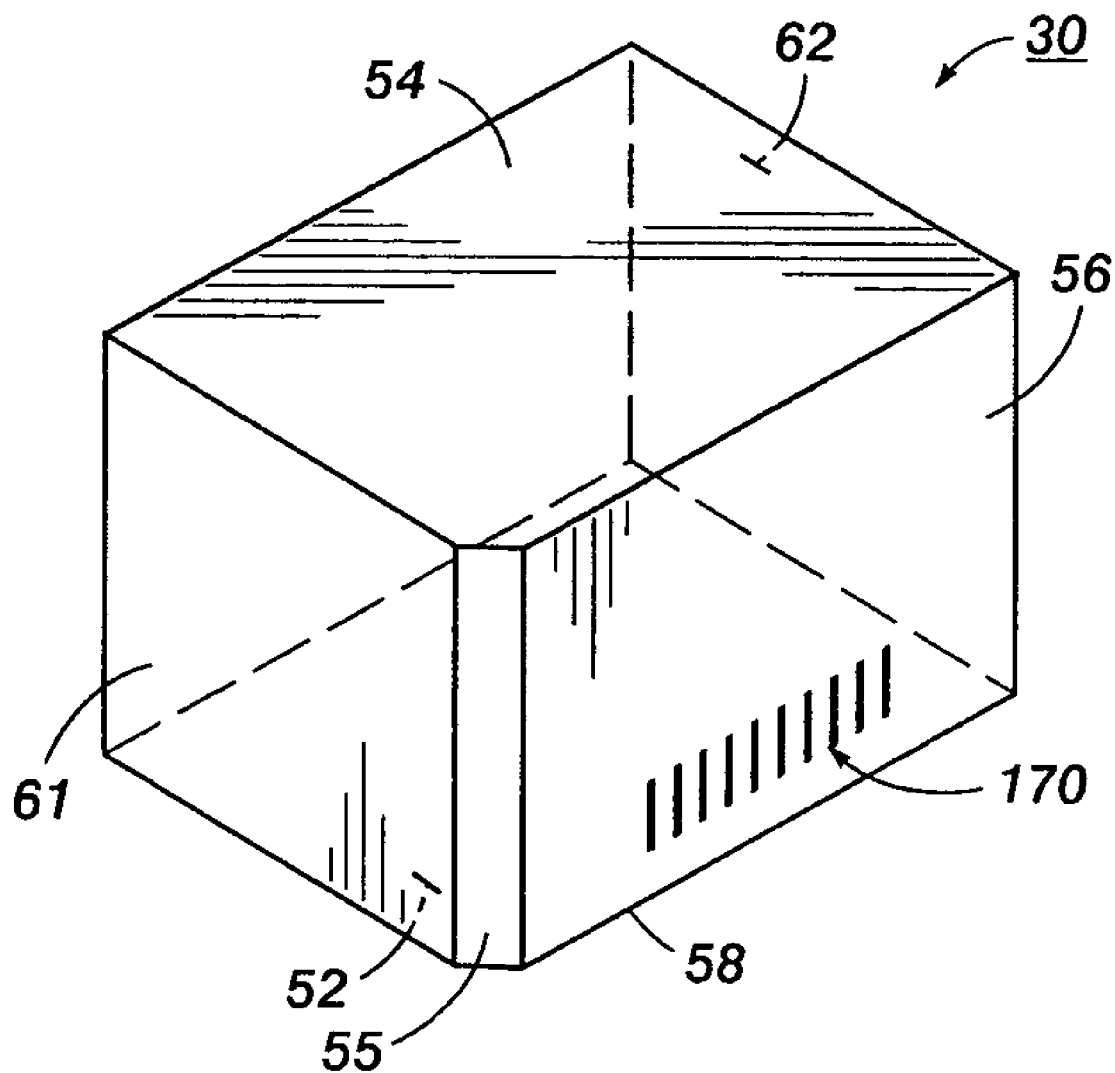
FIG. 11 is a perspective view of another embodiment of a solid ink stick.

In one embodiment, light responsive coating may be applied in an evenly spaced pattern on the exterior surface of the ink stick. One benefit of applying marks intermittently, in an array or other pattern, is to enable determination of ink consumption by comparing the rate of ink mass passing the sensor to theoretical ink mass consumed during imaging. Rather than recording ink consumption in terms of whole ink sticks, the marks enable fractions of a stick to be detectable. For example, as shown in FIG. 11, evenly spaced markings 170 (shown visible for clarity) placed along a lateral surface of an ink stick from a leading end to a trailing end may be used as an indicator of ink consumption. A sensor located in the feed channel detects the markings as they pass, and this information can be used by the printer to determine the approximate amount of an ink stick that has been consumed. For instance, a printer can determine the amount of ink consumed or amount remaining to within 0.1 stick units for an ink stick having 10 evenly spaced markings along a side.

Applying invisible dyes in one or more recesses that are formed as keying features on the surface of the ink stick may help to define the location of the mark in the surface of the ink stick. The recesses may act as a boundary to prevent unwanted spreading of dye to areas outside the recess as the solvent evaporates. In addition, applying the dye to a recessed area on the ink stick may protect the dye from being rubbed or scraped off during handling.

The light responsive coating may be used in combination with keying, orientation and alignment features. This combination of optical and mechanical keying information provides multiple mechanisms for identifying an ink stick. Alternatively, a light responsive coating used for identification and/or authentication purposes may be used as an alternative to keying features. Forming an ink stick without keying features or with less complex features may simplify the manufacturing process as substantially all ink sticks may be formed with a uniform shape regardless of color and/or printer type without the need of special equipment for forming the identification features in the ink stick.

In another embodiment, the light responsive coating may comprise a material applied onto a surface of the ink stick that is capable of reflecting a unique light signature. The material is applied in a thin, substantially invisible coating. Suitable materials are metals such as gold, silver, aluminum, platinum, nickel, or alloys that are capable of reflecting light. The applied material may be beneficially used on ink sticks which have absorptive surfaces. A combination of fluorescent dyes and one or more materials may be used to code a series of reflective and fluorescent marks that may be detected and decoded to gather additional information about an ink stick.

The protective, color enhancing and light responsive coatings described above may be combined into a single coating. Alternatively, each coating may be used alone as a single overcoat layer or in combination with the other coatings in multiple layers of protective, color enhancing and/or light responsive coatings. Multiple coatings may be applied where coatings may be used to provide the exterior surface of an ink stick with properties that differ from those of the interior composition. A solid ink stick having a protective coating applied prior to applying a light responsive coating provides a stable, non-absorptive surface for the application of the light responsive coating. Alternatively, the light responsive coating may be applied prior to applying a protective coating so that the invisible dyes or materials of the light responsive coating, in addition to the ink stick body, are protected by the protective coating.

Figure 12:
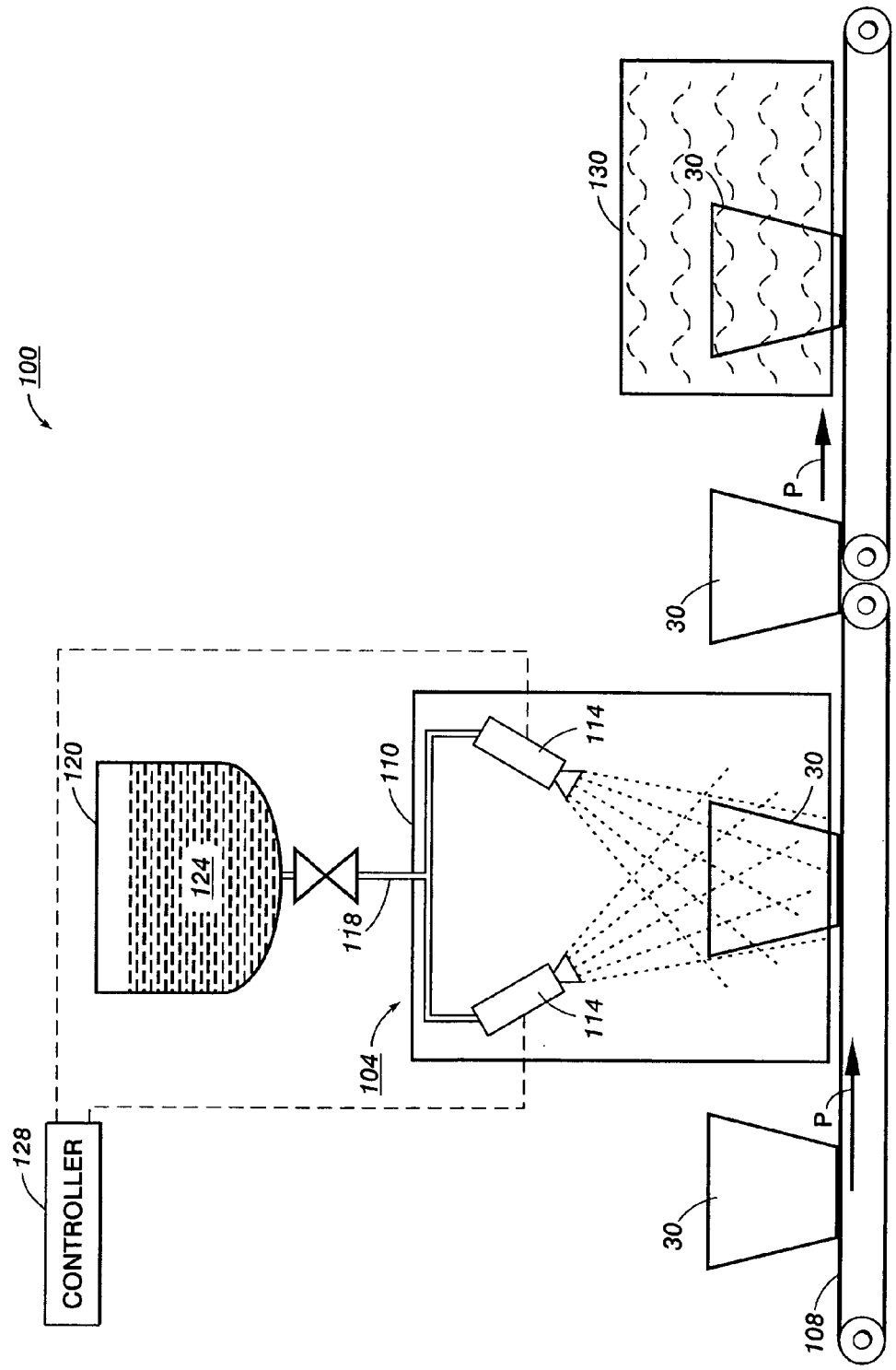
FIG. 12 is a schematic view of a coating station for applying an overcoat to an ink stick.

Referring now to FIG. 12, there is shown an exemplary schematic diagram of a top view of a coating system 100 operable to apply an overcoat layer to a solid ink stick 30. In the exemplary embodiment, coating system 100 comprises an overcoating station 104 and a conveyor 108. The conveyor 108 may comprise one or more conveyor belts for moving one or more ink sticks through the station 104. Any suitable device or method may be used for conveying an ink stick through a spray station. The conveyor 108 may be part of a conveyer system (not shown) comprised of a series of separate conveyor belts that form a continuous path from station to station in an ink stick manufacturing process.

In one embodiment, the coating station 104 comprises a spraying station. The spraying station 104 includes a spray chamber 110 having at least one nozzle 114 coupled via supply conduit 118 to a coating reservoir 120 containing a desired coating composition 124. The spray station 104 may further comprise a controller 128 for controlling the flow and spray pattern of a coating composition 124 emitted from nozzles 114 in spray chamber 110. Controller 128 may be a computer or microprocessor that is programmed to supply uniform quantities and/or particular patterns of the coating composition 124 for spraying onto an ink stick 30.

There are shown two spray nozzles 114, but any suitable number and arrangement of nozzles may be used. Any type of spray nozzle may be used which is capable of spraying the coating composition 124. When using a wax coating, the coating is advantageously applied in the molten state in order to facilitate uniformity of application and adhesion. Therefore, in embodiments in which a molten wax coating is applied, the spray nozzles may be molten wax compatible. The coating reservoir 120 may include thermal elements (not shown) for controlling the temperature of the coating composition while in the reservoir. For instance, if the coating composition is a hot melt composition, such as wax, the thermal elements of the reservoir 120 maintain the coating composition 124 in a molten or liquid state for hot spraying onto an ink stick 30.

In the embodiment of FIG. 12, the nozzles 114 within the spray chamber 110 are arranged for spraying the coating composition 124 toward an ink stick located on the conveyor 108 as the ink stick 30 passes through the chamber 110. The nozzles 114 may be in a fixed position in the spray chamber. Alternatively, the nozzles 114 may include position controllers, robotic arms and/or actuators (not shown) in order to be movable relative to the interior of the spray chamber. The distance from a nozzle 114 to an ink stick 30 on a conveyor belt in the spray chamber may be any suitable distance determined by such non-limiting factors as the type of coating used, the temperature of the coating composition and type of spray nozzle. The elevational position of the nozzles relative to the conveyor, or to an ink stick on the conveyor 108, may be adjustable. The coating application may be optimized according to the requirements associated with a particular coating being used. Generally, the spraying nozzles 114 may be approximately one inch above the exterior surface of the ink stick, in order to ensure that the wax remains molten until after contacting the surface.

In use, ink sticks 30 are conveyed into the spray chamber 110 in the direction of arrow P wherein they pass in close proximity to the spray nozzles 114. The coating composition 124 is sprayed through the nozzles 114 so that it impacts the exterior surface of each ink stick 30 as it passes through the chamber 110, leaving each ink stick 30 with at least a portion of the exterior surface covered with a wet overcoat layer. In one embodiment, the spray chamber 110 may be attached to a support that may be moved along the conveyor 108 such that the nozzles 114 follow the movement of ink sticks during coating. Alternatively, the nozzles 114 may be moved along with the movement of the ink sticks while inside the spray chamber 110. In either case, once a predetermined amount of the coating composition has been sprayed onto the ink stick, coating of the ink sticks ceases. Spray chamber 110 or nozzles 114 are then returned to their initial position to await the movement of a succeeding ink stick or sticks into position in the spraying chamber 110. Alternatively, the continuous movement of the ink sticks on the conveyor 108 may be temporarily halted during the spraying operation, in which case movement of the spray chamber or nozzles is not necessary.

The spray from a nozzle 114 may be configured or shaped, at least in part, by the geometry of the nozzle discharge port (not shown). Thus, a vertically and/or horizontally narrow stream may be formed with a nozzle having a small vertical and/or horizontal dimension and, conversely, a vertically and/or horizontally broad stream may be formed with a nozzle having a large vertical and/or horizontal dimension. Thus, a coating may be applied in patterns, such as in a barcode, by controlling the movement of one or more nozzles as well as the geometry of the nozzle discharge port.

A spray coating process has been emphasized, however, applying a layer, multiple layers or coatings or an external overcoat layer to at least a portion of at least one surface of a solid ink stick may be accomplished by any other suitable method including dipping, rolling, sputtering, stamping, droplets, co-extrusion and the like. For example, in one embodiment, coating compositions may be applied by grasping an ink stick using any suitable apparatus and dipping the substrate into a pool of the coating composition. Alternatively, the overcoat may be applied by pressing a stamping element or coating applicator bearing the coating composition on a surface thereof into contact with the exterior surface of the ink stick.

In some embodiments depending on the coating materials used, the coating material may need to be cured or dried after the coating has been applied. Accordingly, after the ink sticks 30 have been removed from the spraying chamber 110, the conveyor system 108 may transport the ink sticks 30 to a dryer station 130 for drying or curing the coating material. As will be understood by those of ordinary skill, the dryer 130 is chosen to correspond to the heat and moisture requirements of the coating material as well as the phase change ink material to which it is applied. Radiant heat, forced hot air, microwave dryers and combinations of these types are among the types available. Depending upon the type of dryer 130 chosen, one or more conveyors and other apparatus may be required to transfer the ink sticks into and out of the dryer 130.

Additionally, a pre-heating station (not shown) may be placed before the coating station for the purpose of preheating the ink sticks to a temperature above ambient temperature but below the melting temperature of the ink material. In some embodiments, pre-heating the exterior surface of the ink sticks prior to being coated may be beneficial in promoting adhesion of the coating material to the ink stick.

Figure 13:
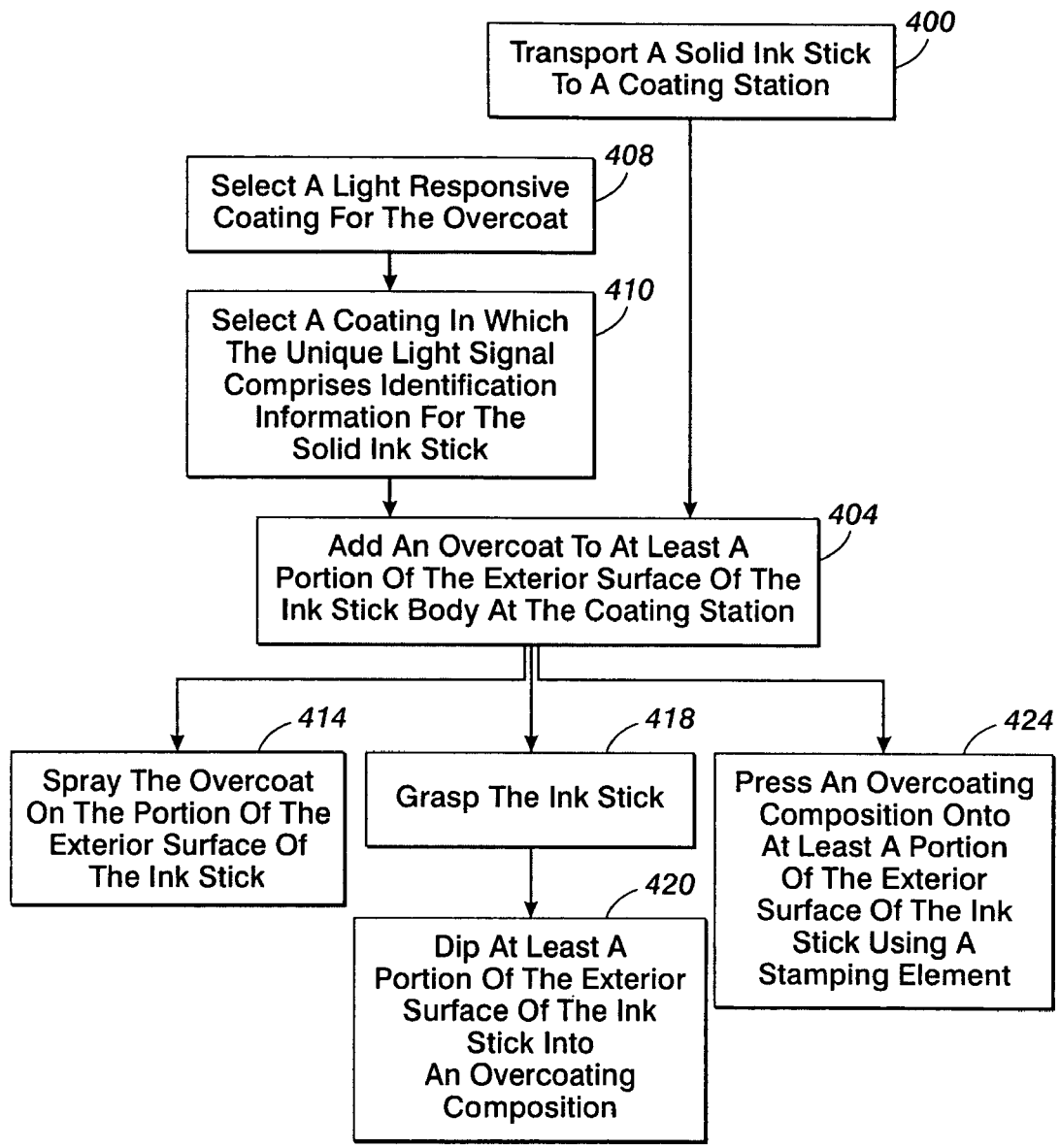
FIG. 13 is a flowchart of an exemplary embodiment of a method of manufacturing a solid ink stick with a coating.

FIG. 13 is a flowchart outlining an exemplary embodiment of a method of manufacturing a solid ink with a coating. The method comprises transporting a solid ink stick to a coating station (block 400). A coating is then applied to at least a portion of the exterior surface of the ink stick body at the coating station (block 404). The method may further comprise, prior to applying the overcoat, selecting the overcoat such that the overcoat comprises a light responsive coating capable of emitting a unique light signal (block 408). The area, areas or pattern to be covered is likewise selected. The light responsive coating may be selected such that the light signal of the coating comprises identification information for the solid ink stick (block 410). In some embodiments, a protective coating may then be applied over the light responsive coating to protect the light responsive coating from being scraped or rubbed off during handling.

In some embodiments, applying the overcoat comprises spraying the overcoat on the portion of the exterior surface of the ink stick (block 414). Alternatively, applying the overcoat may comprise grasping the ink stick (block 418) and dipping at least a portion of the exterior surface of the ink stick into a pool of the overcoating composition (block 420). In yet another embodiment, applying the overcoat may comprise stamping the overcoat onto at least a portion of the exterior surface of the ink stick using a stamping element (block 424).

Those skilled in the art will recognize that numerous modifications can be made to the specific implementations described above. Those skilled in the art will recognize that the ink stick may be formed into numerous shapes and configurations other than those illustrated. In addition, numerous other configurations of the stations, sections and other components of the ink stick forming system can be constructed within the scope of this disclosure. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An ink stick for use in a phase change ink printer, the ink stick comprising:
   a solid ink stick body being formed of a phase change ink material; and
   an overcoat on of the solid ink stick body to form an exterior surface for the ink stick, the overcoat being formed of a material that increases the hardness of the ink stick exterior surface and decreases a coefficient of friction of the ink stick exterior surface, the overcoat and the phase change ink material combining when the ink stick body is melted.

2. The ink stick of claim 1 further comprising:
   a dye highlighter covering the overcoat.

3. The ink stick of claim 1, the overcoat further comprising:
   a dye highlighter.

4. The ink stick of claim 1 further comprising:
   a dye highlighter interposed as a layer between the overcoat and the solid ink stick body.

5. The ink stick of claim 1, the overcoat forming the exterior surface of the ink stick being thicker in portions of the exterior surface that are configured for contact with a feed channel of a solid ink printer.

6. The ink stick of claim 5, the overcoat being thicker on a bottom surface of the ink stick.

7. The ink stick of claim 5, the overcoat being thicker on a lateral surface of the ink stick.

8. The ink stick of claim 5, the overcoat being thicker on a bottom surface and at least one lateral surface of the ink stick.

9. A method for a feed system of a phase change ink imaging device, the method comprising:
   inserting an ink stick into an ink loader of a phase change ink imaging device, the ink stick comprising a solid ink stick body formed with a phase change ink composition and an overcoat on the solid ink stick body to form an exterior surface for the ink stick, the overcoat being formed of a material that increases the hardness of the ink stick exterior surface and decreases a coefficient of friction of the ink stick exterior surface;
   melting the ink stick in the ink loader; and
   combining the phase change ink composition and the overcoat for ejection from a printhead.

10. The method of claim 9 further comprising:
    capturing the melted ink stick in a melted ink reservoir; and
    mixing the phase change ink composition and the melted overcoat in the melted ink reservoir before ejecting the mixture from the printhead.

11. A method of manufacturing an ink stick for use in a phase change ink imaging device, the method comprising:
    forming a solid ink stick body with a phase change ink composition;
    coating the solid ink stick body with a material that increases the hardness of an exterior surface of the ink stick and decreases a coefficient of friction of the exterior surface of the ink stick.

12. The method of claim 11 further comprising:
    forming mixing a dye highlighter with the material forming the ink stick coating before coating the solid ink stick body with the coating material.

13. The method of claim 11 further comprising:
    coating the phase change ink composition of the solid ink stick body with a dye highlighter before coating the solid ink stick body with the material that increases the hardness of an exterior surface of the ink stick and decreases a coefficient of friction of the exterior surface of the ink stick.

14. The method of claim 11 further comprising:
    coating the coating over the solid ink stick body with a dye highlighter.

15. The method of claim 11, the forming of the coating over the solid ink stick body further comprising:
    forming the coating over the solid ink stick body more thickly in portions of the exterior surface that are configured for contact with a feed channel of a solid ink printer.

16. The method of claim 11, the forming of the coating over the solid ink body further comprising:
    forming the coating over the solid ink stick body more thickly on a bottom surface of the solid ink body.

17. The method of claim 11, the forming of the coating over the solid ink body further comprising:
    forming the coating over the solid ink stick body more thickly on at least one lateral surface of the solid ink stick body.

18. The method of claim 11, the forming of the solid ink stick further comprising:
    co-extruding the solid ink stick body and the coating over the solid ink stick body.

19. The method of claim 11, the forming of the solid ink stick comprising:
    co-molding the solid ink stick body and the coating over the solid ink stick body.

* * * * *